United States Patent
Araki et al.

[11] Patent Number: 5,953,292
[45] Date of Patent: Sep. 14, 1999

[54] RAPID DATA REPRODUCTION METHOD AND APPARATUS FOR OPTICAL DISK

[75] Inventors: Yoshitsugu Araki; Junichi Furukawa, both of Tsurugashima, Japan

[73] Assignee: Pioneer Electronic Corporation, Tokyo, Japan

[21] Appl. No.: 09/104,667

[22] Filed: Jun. 25, 1998

[30] Foreign Application Priority Data

Jun. 27, 1997 [JP] Japan ................................. 9-187828

[51] Int. Cl.⁶ ................................................ G11B 17/22
[52] U.S. Cl. ........................... 369/32; 369/37; 369/44.28
[58] Field of Search ................................. 369/32, 44.37, 369/44.28, 44.27, 44.29, 44.31, 44.38

[56] References Cited

U.S. PATENT DOCUMENTS

| | | | |
|---|---|---|---|
| 4,722,079 | 1/1988 | Matsumoto | 369/44.32 |
| 4,759,007 | 7/1988 | Eberly | 369/58 |
| 5,208,792 | 5/1993 | Imanaka | 369/44.38 |
| 5,457,670 | 10/1995 | Maeda et al. | 369/44.28 |
| 5,568,456 | 10/1996 | Hayashi et al. | 369/32 |
| 5,572,493 | 11/1996 | Maeda et al. | 369/44.28 |
| 5,757,746 | 5/1998 | Matsui | 369/44.28 |
| 5,886,964 | 3/1999 | Fujita | 369/44.37 |

*Primary Examiner*—Tan Dinh
*Attorney, Agent, or Firm*—Morgan, Lewis & Bockius LLP

[57] ABSTRACT

A data reproduction method and apparatus reads the tracks of an optical disk by means of a read unit having a plurality of optical beams. The method includes a first reproduction step for simultaneously playing back a first plurality of tracks on a disk using the plurality of optical beams; a first jump step for jumping a greater number of tracks than the number of optical beams in a forward direction; a second reproduction step for simultaneously playing back a second plurality of tracks on the optical disk using the plurality of beams after the first jump step; a second jump step for jumping a greater number of tracks than the number of optical beams in a backward direction opposite to the forward direction; and a third reproduction step for simultaneously playing back a third plurality of tracks on the optical disk using the plurality of optical beams after the second jump step.

16 Claims, 6 Drawing Sheets

RAPID DATA REPRODUCTION METHOD AND APPARATUS FOR OPTICAL DISK

This application claims the benefit of Japanese Patent Application No. 9-187828, filed in Japan on Jun. 27, 1997, which is hereby incorporated by reference.

BACKGROUND OF THE INVENTION

1. Field of the Invention

This invention relates to data reproduction, and more particularly, to rapid data reproduction using a plurality of optical beams to simultaneous play back a plurality of tracks on an optical disk.

2. Description of the Prior Art

In a conventional apparatus, rapid data reproduction is accomplished by playing back a plurality of tracks simultaneously using a plurality of optical beams. Conventional methods execute intentional track jumps as data is reproduced from an inner periphery to an outer periphery. However, data is missed during a track jump, thereby resulting in an incomplete reproduction of data. The track jump data-loss will now be explained in detail with reference to FIG. 3.

In FIG. 3, a track is spirally formed on a disk. Here, each turn of the track is represented by a solid line and labeled with a respective track number 1 through 12. Accordingly, the track begins at the top left of FIG. 3, and when a specific turn is completed, the right end is reached where the next track begins, as represented by the broken line. Actually, the reading beam moves in the radial direction of the disk while the disk rotates, thereby following the track. However, for purposes of illustration, FIG. 3 shows the reading action carried out by moving the reading beam relatively while the track is fixed. The bold lines of the track correspond to the portions of the track to be read by the reading beam.

Referring to FIG. 3, when three tracks are played back simultaneously from a position "a" on the track 4 using three beams, it is necessary to jump two tracks (i.e., three minus one tracks) from a position "b" in the direction of outer periphery after a single turn is completed to reproduce three new tracks.

Because the disk is rotating during the time required to perform the jump, the reading beam deflects in the forward direction to a position "c" of track 7, when the reading beam jumps two tracks in the direction of the outer periphery from position "b". Therefore, data from a position "e" to a position "c" on track 7 will not be read.

As described above, a conventional apparatus can rapidly reproduce data reproduction by playing back a plurality of tracks simultaneously using a plurality of optical beams irradiated on a disk. However, such an apparatus requires the optical beams to perform track jumps, thereby missing data. Thus, reproduction without missing data during a track jump remains an important problem to be solved.

SUMMARY OF THE INVENTION

Accordingly, the present invention is directed to a data reproduction method and apparatus for an optical disk that substantially obviates one or more of the problems due to limitations and disadvantages of the related art.

An object of the present invention is to provide a rapid data reproduction method capable of reading data without data loss.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the data reproduction method for the tracks of an optical disk by means of a read unit having a plurality of optical beams comprises the steps of: a first reproduction step for simultaneously playing back a first plurality of tracks on a disk using the plurality of optical beams, a first jump step for jumping a greater number of tracks than the number of optical beams in a forward direction, a second reproduction step for simultaneously playing back a second plurality of tracks on the optical disk using the plurality of beams after the first jump step, a second jump step for jumping a greater number of tracks than the number of optical beams in a backward direction opposite to the forward direction, and a third reproduction step for simultaneously playing back a third plurality of tracks on the optical disk using the plurality of optical beams after the second jump step.

In another aspect, the data reproduction method for an optical disk comprises the steps of a first reproduction step for simultaneously playing back N tracks using N optical beams, wherein N is a natural number, a first jump step for jumping $(3 \times N-2)$ tracks in a forward direction, a second reproduction step for simultaneously playing back N tracks using the N optical beams after the first jump step, a second jump step for jumping (N+1) tracks in a backward direction opposite the forward direction, and a third reproduction step for simultaneously playing back N tracks using the N optical beams after the second jump step.

In another aspect, the method for reproducing information from tracks of an optical disk by means of a read unit having a plurality of optical beams comprises the steps of a first reproduction step for simultaneously playing back a first plurality of tracks on a disk using the plurality of optical beams, a first jump step for jumping in a forward direction a greater number of tracks than the number of optical beams, a second reproduction step for simultaneously playing back a second plurality of tracks on the optical disk using the plurality of beams after the first jump step, a second jump step for jumping a greater number of tracks than the number of optical beams in a backward direction opposite to the forward direction, a third reproduction step for simultaneously playing back a third plurality of tracks on the optical disk using the plurality of optical beams after the second jump step, a third jump step for jumping a greater number of tracks than the number of optical beams in the forward direction, and a fourth reproduction step for simultaneously playing back a fourth plurality of tracks on the optical disk using the plurality of optical beams after the third jump step.

In another aspect, the method for reproducing information from tracks of an optical disk comprises the steps of a first reproduction step for simultaneously playing back information from N tracks on the optical disk simultaneously using N optical beams, wherein N is a natural number, a first jump step for jumping $(2 \times (N-1))$ tracks in a forward direction, a second reproduction step for simultaneously playing back information from N tracks using the N optical beams after the first jump step, a second jump step for jumping (N+1) tracks in a backward direction opposite to the forward direction, a third reproduction step for simultaneously playing back information from N tracks using the N optical beams after the second jump, a third jump step for jumping (2×(N−1)) tracks in the forward direction, and a fourth reproduction step for simultaneously playing back information from N tracks using the N optical beams after the third jump step.

In another aspect, the data reproduction apparatus for an optical disk storing information in tracks comprises a read unit for simultaneously playing back a first N tracks using N optical beams, wherein N is a natural number, a read unit positioner for jumping the read unit (3×N−2) tracks in a forward direction, the read unit for simultaneously playing back a second N tracks using the N optical beams after jumping (3×N−2) tracks in a forward direction, the read unit positioner jumping (N+1) tracks in a backward direction opposite to the first direction, and the read unit for simultaneously playing back a third N tracks using the N optical beams after the jumping of (N+1) tracks in the backward direction.

In another aspect, the data reproduction apparatus for an optical disk having information stored in tracks comprises a read unit for simultaneously playing back a first N tracks on the disk simultaneously using N optical beams, wherein N is a natural number, a read unit positioner for jumping a first (2×(N−1)) tracks in a forward direction, the read unit for simultaneously playing back a second N tracks using the N optical beams after the jumping of (2×(N−1)) tracks in a forward direction, the read unit positioner for jumping (N+1) tracks in a backward direction, opposite to the forward direction, the read unit for simultaneously playing back a third N tracks using the N optical beams after jumping (N+1) tracks in the backward direction, the read unit for jumping a second (2×(N −1)) tracks in the forward direction, and the read unit for simultaneously playing back a fourth N tracks using the N optical beams after the jumping the second (2×(N−1)) tracks in the forward direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE PREFERRED EMBODIMENTS

Figure 1:
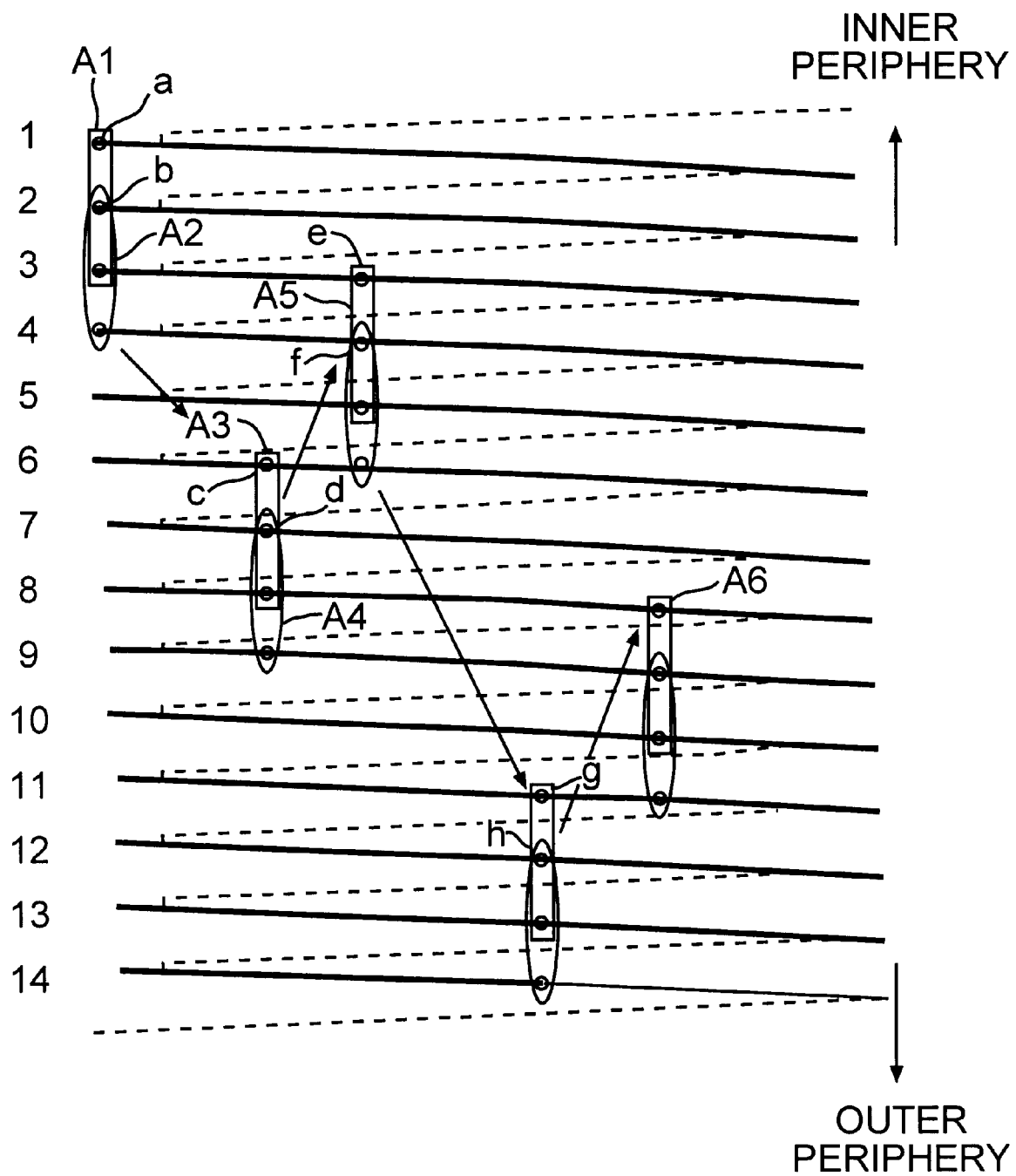
FIG. 1 is a schematic diagram of reading beam trace for explaining an action according to a first embodiment of the present invention.

The data reproduction method for a disk player, as described herein, comprises a first reproduction step for playing back a plurality of tracks on a disk simultaneously using a plurality of beams, a first jump step for jumping more tracks than the plurality of beams in a forward direction, a second reproduction step for playing back a plurality of tracks on the disk simultaneously using the plurality of beams after the first jump step, a second jump step for jumping more tracks than the plurality of beams in a backward direction; and a third reproduction step for playing back a plurality of tracks on the disk simultaneously using the plurality of beams after the second jump step.

In a further aspect, the data reproduction method for a disk player according to the present invention comprises a first reproduction step for playing back N (N natural number) tracks simultaneously using N beams, a first jump step for jumping (3×N−2) tracks in a forward direction, a second reproduction step for playing back N tracks simultaneously using the N beams after the first jump steps; a second jump step for jumping (N+1) tracks in a backward direction, and a third reproduction step for playing back N tracks simultaneously using N beams after the second jump step.

In a further aspect, the data reproduction method for a disk player of the present invention comprises a first reproduction step for playing back a plurality of tracks on a disk simultaneously using a plurality of beams, a first jump step for jumping more tracks than the plurality of beams in a forward direction, a second reproduction step for playing back a plurality of tracks on the disk simultaneously using the plurality of beams after the first jump step, a second jump step for jumping more tracks than the plurality of beams in a backward direction, a third reproduction step for playing back a plurality of tracks on the disk using the plurality of beams after the second jump step, a third jump step for jumping more tracks than the plurality of beams in the forward direction, and a fourth reproduction step for playing back a plurality of tracks on the disk using the plurality of beams after the third jump step.

The data reproduction method for a disk player according to the present invention also contemplates a first reproduction step for playing back N (N: natural number) tracks on a disk simultaneously using N beams, a first jump step for jumping (2×(N−1)) tracks in a forward direction, a second reproduction step for playing back N tracks simultaneously using the N beams after the first jump step, a second jump step for jumping (N+1) tracks in a backward direction, a third reproduction step for playing back N tracks using the N beams after the second jump, a third jump step for jumping (2×(N−1)) tracks in the forward direction, and a fourth reproduction step for playing back N tracks using the N beams after the third jump step.

Reference will now be made in detail to the preferred embodiments of the present invention, examples of which are illustrated in the accompanying drawings.

Figure 4:
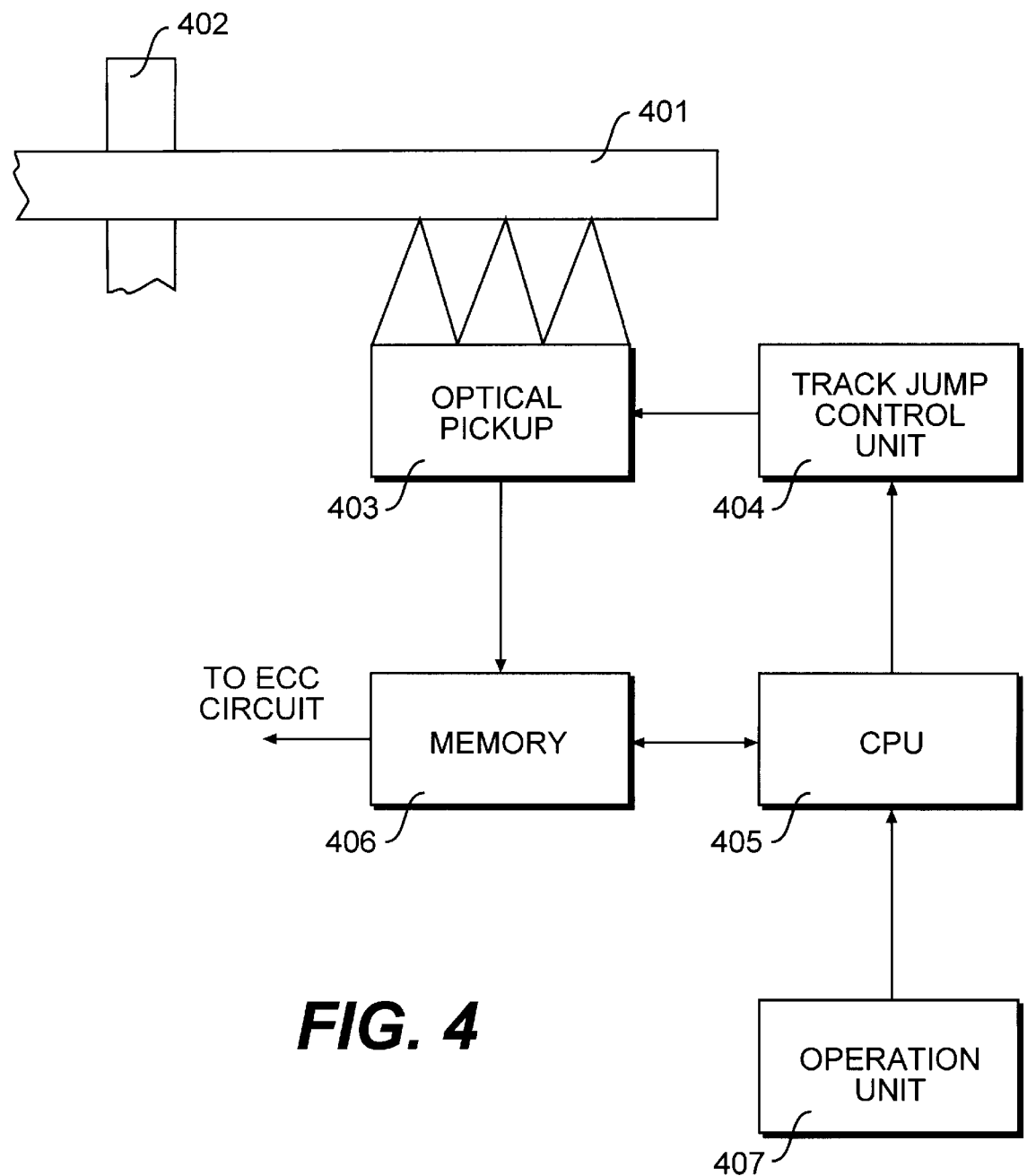
FIG. 4 is a diagram showing an example of a structure of an apparatus for realizing the data reproduction method of the present invention.

FIG. 4 shows an example of a structure of an apparatus for realizing the data reproduction method of the present invention. FIG. 4 shows a configuration in which three tracks are simultaneously played back using three optical beams.

Referring to FIG. 4, the apparatus comprises a disk 401 used as a recording medium, a spindle 402 for rotating the disk 401, and an optical pickup 403 for reading record data on the disk 401 using three optical beams. The apparatus further comprises a track jump control unit 404 for controlling reading by the optical pickup 403, and a central processing unit (CPU) 405 for controlling the track jump control unit 404 according to an instruction from an operation unit 407 or read data, for writing data read by the optical pickup 403 into a memory 406, and for reading data from the memory 406 according to a request of an ECC circuit (not shown) for error correcting.

The disk 401 is rotated at a predetermined rotation speed by the spindle 402 controlled by a rotation control unit (not shown). The optical pickup 403 forms three reading beams using an optical system having a laser light source (not shown) and an objective lens (not shown), thereby reading data recorded on the disk 401.

The track jump control unit 404 controls a disk reading position of the optical pickup 403 according to instructions from the CPU 405 and moves the optical pickup 403 to a desired position. Data read from the disk 401 by the optical pickup 403 is stored in the memory 406. The read data includes an address portion indicating a position thereof on the disk and information portion such as audio or video information.

The memory 406 has predetermined addresses, and data read by the optical pickup 403 is stored at an appropriate address of the memory 406. The data stored in the memory 406 is output to the ECC circuit (not shown) as the error correcting means, which corrects an error, so that the corrected data is used as a reproduced signal for video, audio, computer data, or the like.

The CPU 405 detects whether or not data corresponding to a single turn of a disk 401 has been written based on data written in the memory 406, for example, the address portion in the data. That is, if at least one beam of the plurality of reading beams has read data having the same address as data read at the last turn, the CPU 405 determines that data has been obtained corresponding to a single turn of the disk 401.

The operation unit 407 may be, for example, a control panel, keyboard or the like for use in transmitting a user's operational instruction to the CPU 405. Of course, other input means may be used as the operation unit 407.

Figure 5:
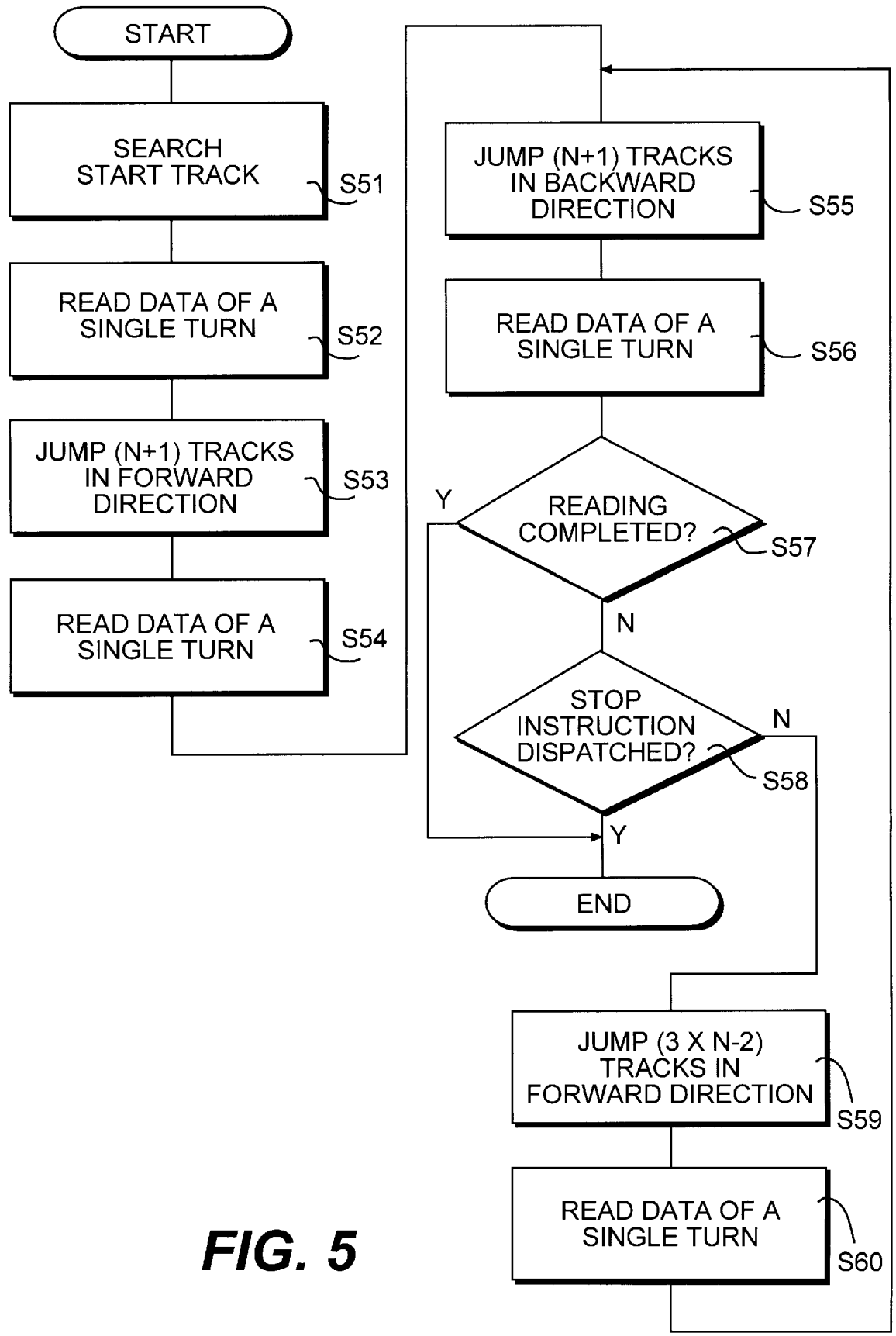
FIG. 5 is a flow chart for explaining FIG. 1.

Next, the operation of a first embodiment of the present invention will now be described with reference to FIGS. 1 and 5. FIG. 1 shows a schematic diagram showing a trace of the disk by the reading beam according to the first embodiment. FIG. 5 provides a flow chart explaining the process of FIG. 1. Here, it is assumed that the number (N) of the reading beams (with N being a natural number) is three, and continuous data from track 1 to track 13 is to be read out. Of course, other numbers of reading beams can be utilized.

FIG. 1 indicates a portion corresponding to a single turn of a spiral track by a solid line and track numbers 1 through 14. The track begins from the top left of FIG. 1 and a single turn is completed when the right end is reached, thereby beginning the next track as represented by the broken lines.

That is, the track proceeds from top to bottom in FIG. 1. In FIG. 1, the upper tracks correspond to a lower track numbers. Further, the downward direction indicates the direction toward the outer periphery, and the upward direction indicates the direction toward the center. That is, a center of the disk is located toward the top.

Further, as for the radial direction of the disk, a direction in which the beam moves as the disk rotates during reading data is called the forward direction, and the direction opposite to the forward direction is designated as the backward direction. According to the present description, the track is formed from the inner periphery to the outer periphery. Because the reading beam traces the track from the inner periphery to the outer periphery during reading data, a direction toward the outer periphery is the forward direction and a direction toward the inner periphery is the backward direction.

Actually, the beam moves in the radial direction of the disk as the disk rotates, thereby following the track. However, the explanation of FIG. 1 is provided as if the reading action is carried out by moving the reading beam relatively while the track (disk) is fixed. A bold line of the track indicates a portion of the track read by the reading beam.

First, if an instruction for data reproduction is dispatched from the operation unit 407 at step S51 of FIG. 5, the CPU 405 makes the reading beam search a start track of data to be reproduced. In the example of FIG. 1, it is assumed that when the search is completed, a beam located at the innermost side of the three reading beams is located at a position indicated by "a" of track 1.

It is defined that a reading beam located at the most inside is R1, a reading beam located outwardly adjacent to R1 is R2 and a reading beam located outwardly to R2 is R3. A rectangle A1 expressed on the tracks 1, 2, 3 indicates positions of the reading beams R1, R2, R3 just after the search is completed.

Next, the processing proceeds to step S52, in which data of a single turn from the searched position is read. Referring to FIG. 1, if the reading beam group reads data of a single turn of each track from the position indicated by A1, the respective reading beams R1, R2, R3 move to a position indicated by an ellipse A2 expressed on the tracks 2, 3, 4. This means that the respective beams have advanced by each track toward the outer periphery. As a result, the reading beam R1 moves to a position indicated by a point "b" on the track 2.

Consequently, data from the start points of the tracks 1, 2, 3 up to end points thereof have been read by the reading beams R1, R2, R3. The read data is stored successively at a predetermined address in the memory 406, Here, it is apparent that the disk has made a single turn from the predetermined position in the aforementioned manner. That is, because data having the same address as the data read by R2 when the beams R1, R2, R3 are located at A1 is read by R1 when they are located at A2, it can be detected that data of a single turn has been obtained at this point of time.

Next, the processing proceeds to step S53, in which the reading beam group jumps (N+1) or four tracks from the position A2 in the forward direction (toward the outer periphery). As a result, the reading beam R1 moves to a point indicated by a point "c" on the track 6. That is, the reading beam group moves to a rectangle A3. Meanwhile, an arrow from A2 to A3 indicates a jump of the reading beams.

Then, the processing proceeds to step S54 in which the reading beam group reads data of a single turn from the position A3. As a result, the reading beam group moves by a single track toward the outer periphery, so that they move to an ellipse A4 expressed on tracks 7, 8, 9. That is, R1 moves to a position "d".

Next, the processing proceeds to step S55, in which the reading beams jump (N+1) or four tracks in the backward direction. As a result, R1 moves to a position indicated by "e" on the track 3. Then, the processing proceeds to step S56, in which data of a single turn is reproduced. Then, the reading beam R1 moves to a point indicated by "f" on the track 4. Up to this point of time, data from the beginning track 1 to A4 on the track 9 has been written into the memory 406.

Next, the processing proceeds to step S57, in which whether or not data to be reproduced has been read is determined. If the reading is not completed, the processing proceeds to step S58, in which whether or not a stop instruction is dispatched by the operation unit 407 is determined. If the stop instruction is not dispatched, the processing proceeds to step S59. If all data has been read at the step S57 or a stop instruction has been dispatched at step S58, the processing is terminated.

Because all the data has not yet been read in the example of FIG. 1, the processing proceeds to step S59. At step S59, the reading beams jump (3×N−2) or seven tracks in the forward direction (toward the outer periphery). As a result, the reading beam R1 moves to a point indicated by "g" on the track 11. Then, the processing proceeds to step S60, in which data of a single turn is reproduced. As a result, the reading beam R1 moves to a point indicated by "h" on the track 12. Subsequently, the series of processing steps from step S55 to step S60 are repeated until reading of data to be reproduced is completed or a stop instruction is dispatched.

In the example of FIG. 1, the processing returns to step S55 to further read data, in which the beams jump (N+1) or four tracks in the backward direction (toward the inner periphery) and then data of a single turn is read (step S56). Up to this point of time, all data from track 1 to track 13 has been written in the memory 406. Therefore, at step S57, the CPU 405 determines that data reading is complete and the processing is terminated.

The processing described above are summarized as follows. Data is read from the start track of data to be reproduced via a single turn and then the beams jump (N+1) tracks in the forward direction, and data is read for a single turn. After that, a jump of (N+1) tracks in the backward direction is performed and reading continues for a single turn. Next, a jump of (3×N−2) tracks in the forward direction is performed, and reading continues for a single turn. These series of process steps are repeated until all of the predetermined data is read or a stop instruction is dispatched from the operation unit 407. As a result, as shown in FIG. 1, predetermined data on a disk can be read quickly without any omission.

Figure 2:
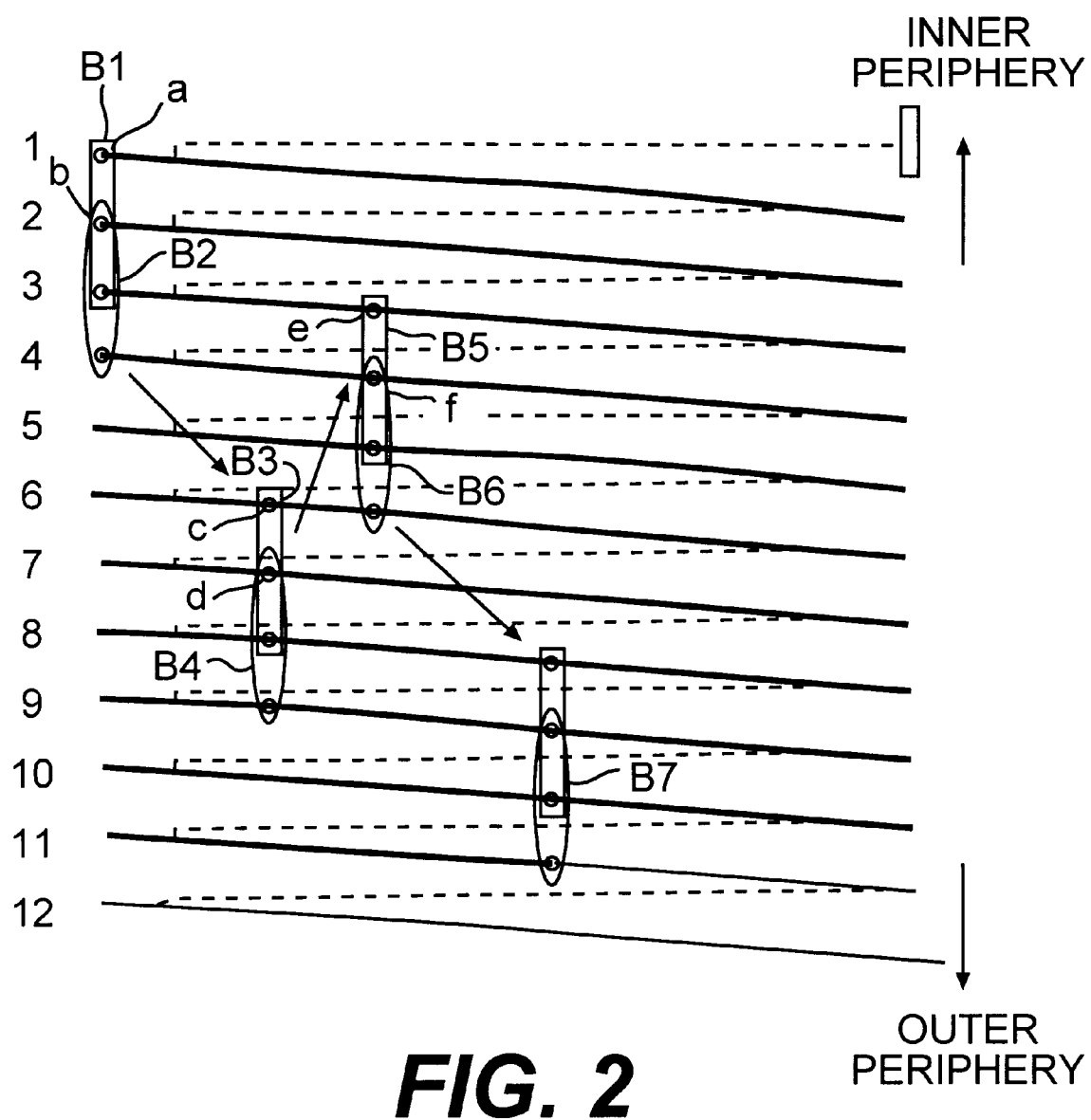
FIG. 2 is a schematic diagram of reading beam trace for explaining an action according to a second embodiment of the present invention.
Figure 3:
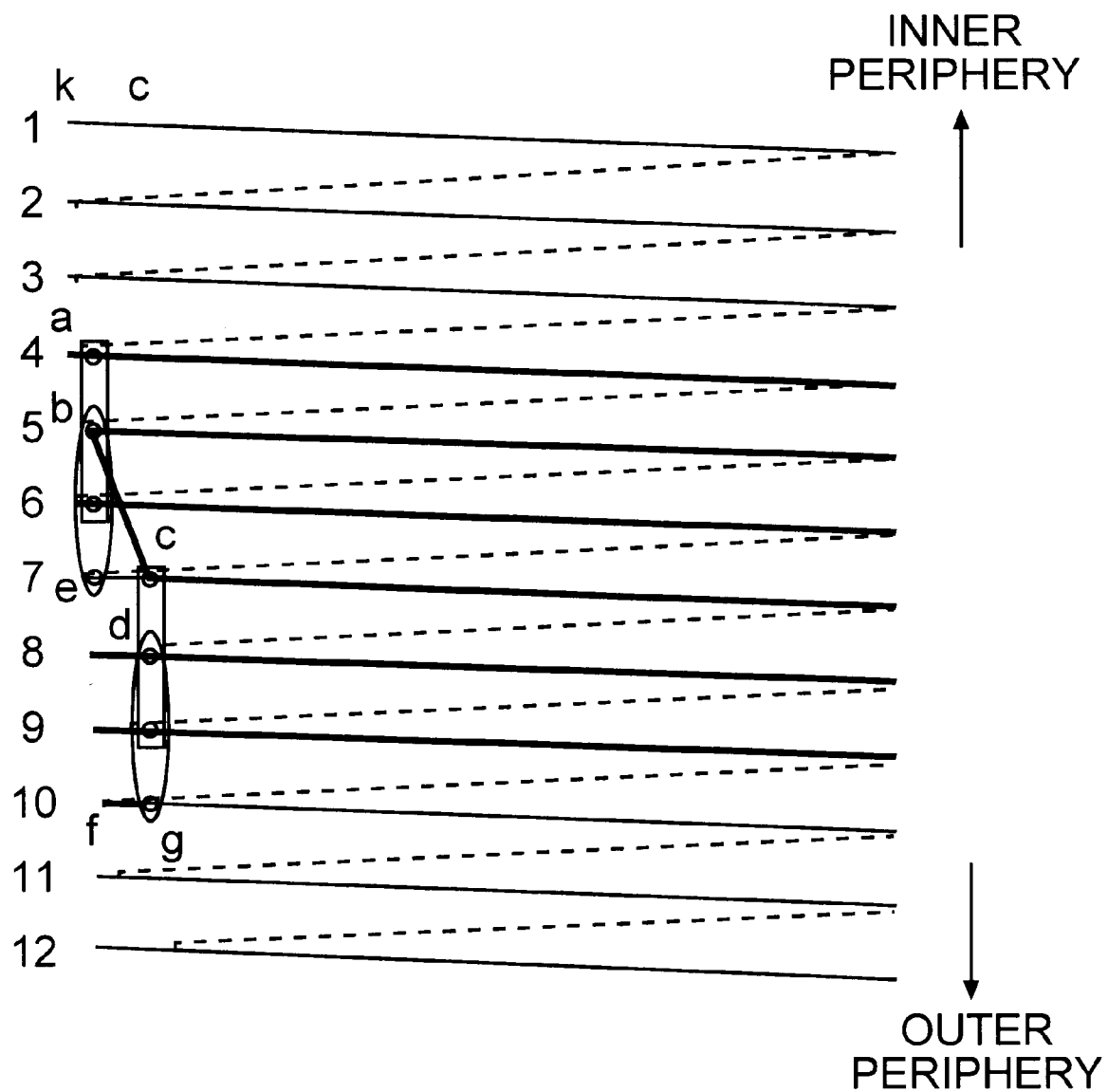
FIG. 3 is a schematic diagram indicating reading beam trace upon track jump according to a conventional method.
Figure 6:
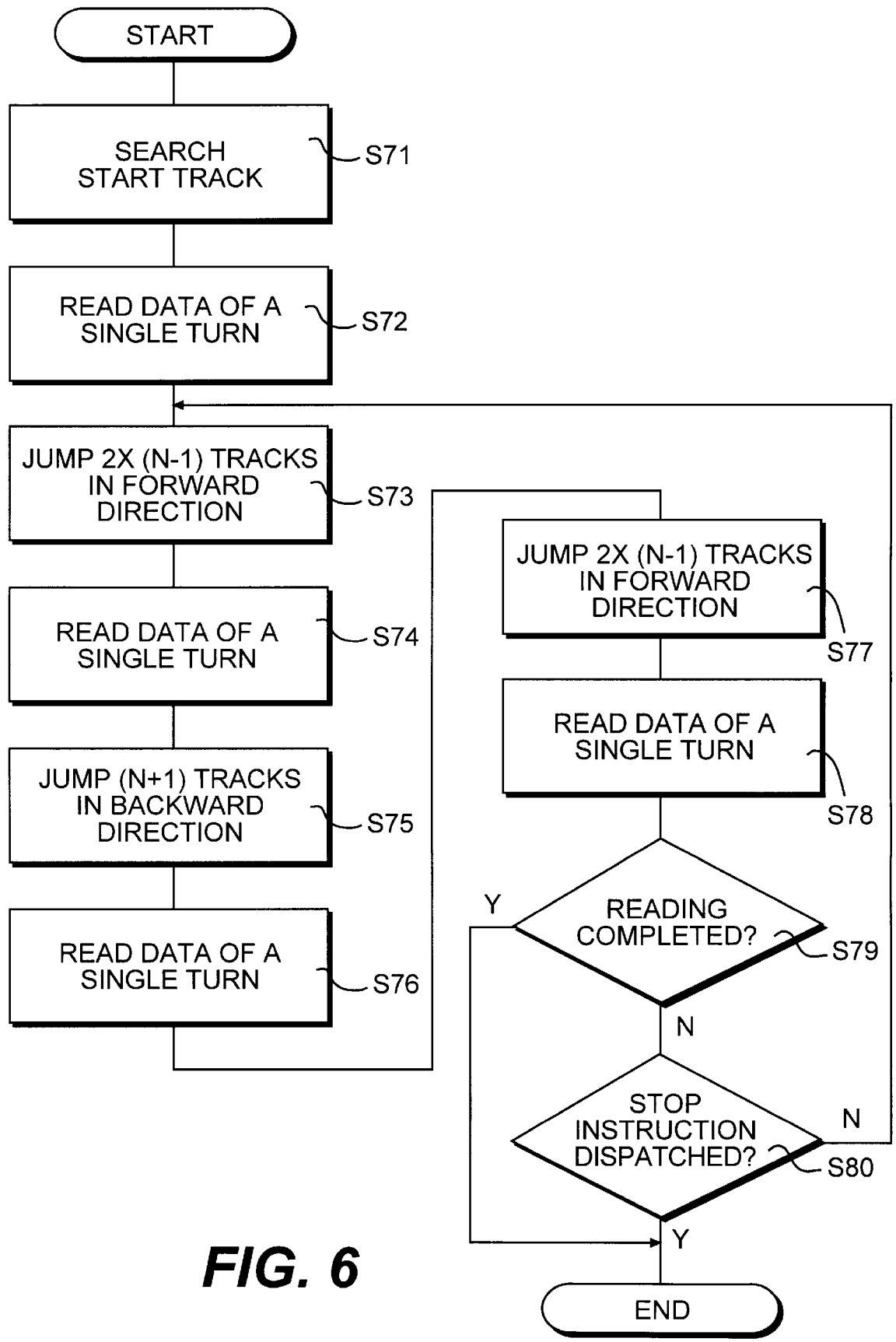
FIG. 6 is a flow chart for explaining FIG. 2.

A second embodiment according to the present invention will now be described with reference to FIGS. 2 and 6. The structure of the apparatus for achieving the second embodiment is similar to that of FIG. 4. FIG. 2 is a schematic diagram showing the trace pattern of the reading beams according to the second embodiment of the present invention. FIG. 6 is a flow chart explaining the process of FIG. 2. In this description, the number (N) of reading beams is 3, and continuous data from track 1 to track 10 is to be read out. However, any number of reading beams may be used.

FIG. 2 indicates a portion corresponding to a single turn of a spiral track by a solid line like FIG. 1 and track numbers 1 through 12. The track begins from the top left of FIG. 2 and when a single turn is completed, the right end is reached and, thus the next track begins as represented by the broken lines. That is, the track proceeds from top to bottom in FIG. 2.

An upper track corresponds to a lower number track. The downward direction indicates the direction toward the outer periphery, and the upward direction indicates the direction toward the center. Like FIG. 1, the description of FIG. 2 is given as if the reading action is carried out by moving the reading beam relatively while the track (disk) is fixed. A bold line of the track indicates a portion of the track read by the reading beam.

First, if a data reproduction instruction is dispatched from the operation unit at step S71 of FIG. 6, the CPU causes the reading beam to search a start track of data to be reproduced. In the example of FIG. 2, it is assumed when the search of the reading beams is completed, a reading beam is located at an innermost point indicated by "a" on the track 1.

Further, it is defined that an innermost reading beam is R1, a reading beam outwardly adjacent to R1 is R2 and a reading beam outwardly adjacent to R2 is R3. In FIG. 2, a rectangle B1 expressed on the tracks 1, 2, 3 indicates positions of R1, R2, R3 just after the search is completed.

Next, the processing proceeds to step S72, in which data of a single turn from the searched position is read. That is, in FIG. 2, if the reading beam group reads data of a single turn of each track from the position indicated in B1, the respective reading beams R1, R2, R3 move to an ellipse B2 expressed on tracks 2, 3, 4. This means that the respective reading beams have moved by a single track in the direction of the outer periphery. As a result, the reading beam R1 moves to a point indicated by "b" on track 2.

In this manner, data from the start point of tracks 1, 2, 3 up to the end point thereof are read into the memory 406 by the respective reading beams R1, R2, R3. At this time, it is possible to detect that data of a single turn has been obtained in the aforementioned manner.

Next, the processing proceeds to step S73 in which the reading beam group jumps (2×(N−1)) or four tracks from the B2 position in the forward direction (direction of the outer periphery). As a result, the reading beam R1 is moved to a point indicated by "c" on the track 6. That is, the reading beam group is moved to a position of a rectangle B3. Meanwhile, an arrow from B2 to B3 indicates a jump of the reading beam.

Next, the processing proceeds to step S74, in which the reading beam group reads data of a single turn of each track from the B3 position. As a result, the reading beam group is moved by a single track in the direction of the outer periphery to an ellipse B4 expressed on tracks 7, 8, 9. The reading beam R1 is moved to a point indicated by "d".

Next, the processing proceeds to step S75, in which the reading beams jump (N+1) or four tracks in the backward direction (toward the inner periphery). As a result, the reading beam group is moved to a rectangle B5 so that R1 is moved to a point indicated by "e" on track 3. Then, the processing proceeds to step S76, in which data of a single turn is reproduced, and the reading beam group is moved to B6 so that R1 is moved to a point indicated by "f" on track 4.

Next, the processing proceeds to step S77 in which the reading beams jump (2×(N−1)) or four tracks in the forward direction (toward the outer periphery). Then, after data of a single turn is reproduced at step S78, the reading beam group is moved to a position indicated by an ellipse B7. Up to this point of time, data from the start track 1 to the B7 portion of the track 11 has been read into the memory 40.

Next, the processing proceeds to step S79 in which it is determined whether or not all of the data to be reproduced has been read. If such reading is not completed, the processing proceeds to step S80, in which whether or not a stop instruction has been dispatched from the operation unit 407 is determined. If the stop instruction has not been dispatched, the processing returns to step S73. If reading of all data is completed at step S79 or the stop instruction has been dispatched at step S80, the processing is terminated. Because in the example of FIG. 2, all data to be reproduced has been read, it is determined that reading of data is completed and then the processing is terminated.

The processes described above are summarized as follows. After data is read from the start track of data to be reproduced via a single turn, the beams jump (2×(N−1)) tracks in the forward direction and data of a single turn is read out. After that, an action of jumping (N+1) tracks in the backward direction and reading data of a single turn, and an action of jumping $(2\times(N-1))$ tracks in the forward direction and reading data of a single turn are repeated until all of the predetermined data has been read or a stop instruction has been dispatched from the operation unit 407. As a result, as shown in FIG. 2, the disk can be rapidly read without missing any data.

Meanwhile, although in the above-described first and second embodiments, the explanation therein is given assuming that the direction toward the outer periphery is forward direction and the direction toward the inner periphery is backward direction, the present invention is not restricted to this example. For example, when the reading beams move from the outer periphery to the inner periphery while reading data, if it is assumed that the direction toward the inner periphery is the backward direction and the direction toward the outer periphery is the forward direction, the present invention can be applied.

Further, in the first embodiment, although the track 3 is read by the R3 beam when the beam group reads single turn data from A1, this is also read by the R1 beam when the single turn data is read from A5. Further, although the track 8 is read by the R3 beam when the beam group reads single turn data from A3, this data is also read by the R1 beam when the single turn data is read from A6. In the second embodiment also, the two tracks 3, 8 are read in duplication.

As for the data read in duplication, data fetching in duplication can be avoided by inhibiting a rewrite or overwrite of the memory based on an address portion in data when data is stored in the memory.

As described above, when data is read according to the present invention, there are produced duplicated portions in read data. Actually, in the first embodiment, a single track is read twice while the disk makes two turns and in the second embodiment, two tracks are read twice while the disk makes three turns. However, if the transmission rate in a case of reading with three beams is calculated, $(3\times2-1)/2=2.5$ time speed and $(3\times3-2)/3=2.3$ time speed are obtained in the respective embodiments. Thus, speeds are more than twice those achieved by conventional methods using a single reading beam.

It will be apparent to those skilled in the art that various modifications and variations can be made in the data reproduction method for an optical disk of the present invention without departing from the spirit or scope of the invention. Thus, it is intended that the present invention cover the modifications and variations of this invention provided they come within the scope of the appended claims and their equivalents.

What is claimed is:

1. A data reproduction method for the tracks of an optical disk by means of a read unit having a plurality of optical beams, comprising the steps of:
    a first reproduction step for simultaneously playing back a first plurality of tracks on a disk using the plurality of optical beams;
    a first jump step for jumping a greater number of tracks than the number of optical beams in a forward direction;
    a second reproduction step for simultaneously playing back a second plurality of tracks on the optical disk using the plurality of beams after the first jump step;
    a second jump step for jumping a greater number of tracks than the number of optical beams in a backward direction opposite to the forward direction; and
    a third reproduction step for simultaneously playing back a third plurality of tracks on the optical disk using the plurality of optical beams after the second jump step.

2. The data reproduction method for an optical disk according to claim 1, wherein data corresponding to respective single turns of the optical disk is reproduced at the first, second, and third reproduction steps.

3. The data reproduction method for an optical disk according to claim 1, wherein the first jump step through third reproduction step are repeated until all desired data is reproduced.

4. A data reproduction method for an optical disk, comprising the steps of:
    a first reproduction step for simultaneously playing back N tracks using N optical beams, wherein N is a natural number;
    a first jump step for jumping $(3\times N-2)$ tracks in a forward direction;
    a second reproduction step for simultaneously playing back N tracks using the N optical beams after the first jump step;
    a second jump step for jumping $(N+1)$ tracks in a backward direction opposite the forward direction; and
    a third reproduction step for simultaneously playing back N tracks using the N optical beams after the second jump step.

5. The data reproduction method for an optical disk according to claim 4, wherein, data corresponding to respective single turns of the optical disk is reproduced at the first, second, and third reproduction steps.

6. The data reproduction method for a disk player according to claim 4, wherein the first jump step through third reproduction step are repeated until all desired data is reproduced.

7. A method for reproducing information from tracks of an optical disk by means of a read unit having a plurality of optical beams, comprising the steps of:
    a first reproduction step for simultaneously playing back a first plurality of tracks on a disk using the plurality of optical beams;
    a first jump step for jumping in a forward direction a greater number of tracks than the number of optical beams;
    a second reproduction step for simultaneously playing back a second plurality of tracks on the optical disk using the plurality of beams after the first jump step;
    a second jump step for jumping a greater number of tracks than the number of optical beams in a backward direction opposite to the forward direction;
    a third reproduction step for simultaneously playing back a third plurality of tracks on the optical disk using the plurality of optical beams after the second jump step;
    a third jump step for jumping a greater number of tracks than the number of optical beams in the forward direction; and
    a fourth reproduction step for simultaneously playing back a fourth plurality of tracks on the optical disk using the plurality of optical beams after the third jump step.

8. The data reproduction method for an optical disk according to claim 7, wherein data corresponding to respective single turns of the optical disk is reproduced at the first, second, third, and fourth reproduction steps.

9. The data reproduction method for an optical disk according to claim 7, wherein the first jump step through the fourth reproduction step are repeated until all desired data is reproduced.

10. A method for reproducing information from tracks of an optical disk, comprising the steps of:

a first reproduction step for simultaneously playing back information from N tracks on the optical disk simultaneously using N optical beams, wherein N is a natural number;

a first jump step for jumping (2×(N−1)) tracks in a forward direction;

a second reproduction step for simultaneously playing back information from N tracks using the N optical beams after the first jump step;

a second jump step for jumping (N+1) tracks in a backward direction opposite to the forward direction;

a third reproduction step for simultaneously playing back information from N tracks using the N optical beams after the second jump;

a third jump step for jumping (2×(N−1)) tracks in the forward direction; and a fourth reproduction step for simultaneously playing back information from N tracks using the N optical beams after the third jump step.

11. The data reproduction method for an optical disk according to claim 10, wherein data corresponding to respective single turns of the optical disk is reproduced at the first, second, third, and fourth reproduction steps.

12. The data reproduction method for an optical disk according to claim 10, wherein the first jump step through the fourth reproduction step are repeated until all desired data is reproduced.

13. A data reproduction apparatus for an optical disk storing information in tracks, comprising:

a read unit for simultaneously playing back a first N tracks using N optical beams, wherein N is a natural number;

a read unit positioner for jumping the read unit (3×N−2) tracks in a forward direction;

the read unit for simultaneously playing back a second N tracks using the N optical beams after jumping (3×N−2) tracks in a forward direction;

the read unit positioner jumping (N+1) tracks in a backward direction opposite to the first direction; and the read unit for simultaneously playing back a third N tracks using the N optical beams after the jumping of (N+1) tracks in the backward direction.

14. The reproduction apparatus for an optical disk according to claim 13, wherein the first N tracks, second N tracks, and third N tracks each correspond to a single turn of the optical disk.

15. A data reproduction apparatus for an optical disk having information stored in tracks, comprising:

a read unit for simultaneously playing back a first N tracks on the disk simultaneously using N optical beams, wherein N is a natural number;

a read unit positioner for jumping a first (2×(N−1)) tracks in a forward direction;

the read unit for simultaneously playing back a second N tracks using the N optical beams after the jumping of(2×(N−1)) tracks in a forward direction;

the read unit positioner for jumping (N+1) tracks in a backward direction, opposite the forward direction;

the read unit for simultaneously playing back a third N tracks using the N optical beams after jumping (N+1) tracks in the backward direction;

the read unit for jumping a second (2×(N−1)) tracks in the forward direction; and the read unit for simultaneously playing back a fourth N tracks using the N optical beams after the jumping the second (2×(N−1)) tracks in the forward direction.

16. The reproduction apparatus for an optical disk according to claim 15, wherein the first N tracks, second N tracks, and third N tracks each correspond to a single turn of the optical disk.

* * * * *